United States Patent [19]

Archibald et al.

[11] E Re. 29,021

[45] Reissued Nov. 2, 1976

[54] UNDERGROUND MINING SYSTEM

[75] Inventors: William R. Archibald, Tiburon; John J. Gilbert, San Francisco, both of Calif.

[73] Assignee: Marcona Corporation, San Francisco, Calif.

[22] Filed: July 14, 1975

[21] Appl. No.: 595,506

Related U.S. Patent Documents

Reissue of:

[64] Patent No.: 3,797,590
Issued: Mar. 19, 1974
Appl. No.: 324,168
Filed: Jan. 16, 1973

[52] U.S. Cl. ..... 175/213; 175/67; 175/422; 299/17; 299/64

[51] Int. Cl.[2] ..... E21C 45/00

[58] Field of Search ..... 299/17, 18, 64; 175/67, 175/213, 217, 422

[56] References Cited

UNITED STATES PATENTS

| | | | |
|---|---|---|---|
| 2,678,203 | 5/1954 | Huff | 299/17 X |
| 3,393,013 | 7/1968 | Hammer et al. | 299/17 |
| 3,799,614 | 3/1974 | Miscovich et al. | 299/17 |

FOREIGN PATENTS OR APPLICATIONS

| | | | |
|---|---|---|---|
| 208,603 | 10/1956 | Australia | 299/17 |

*Primary Examiner*—Ernest R. Purser
*Attorney, Agent, or Firm*—Flehr, Hohbach, Test, Albritton & Herbert

[57] ABSTRACT

Hydraulic underground mining system adapted to operate through a small diameter well bore and into a subterranean body and including a mining capsule carried on the lower end of an elongate support structure. The mining capsule includes a liquid jet nozzle at its upper end for forming a laterally directed jet stream to impact material in the ore body and to pulp the same into a slurry. An orifice having a grate for preventing entry of excessively large material is positioned below the jet so that freshly pulped slurry flows into the orifice, the latter being connected to an elongate positive displacement pump mounted below the orifice. Suitable hydraulic power means are provided for operating the pump and for progressively moving the jet stream [to] *through* at least a portion of an arc. Fixed liquid jets are also provided at the pump inlet for flushing and priming and to the lowermost portion of the capsule and to facilitate movement of the apparatus in the well bore.

10 Claims, 12 Drawing Figures

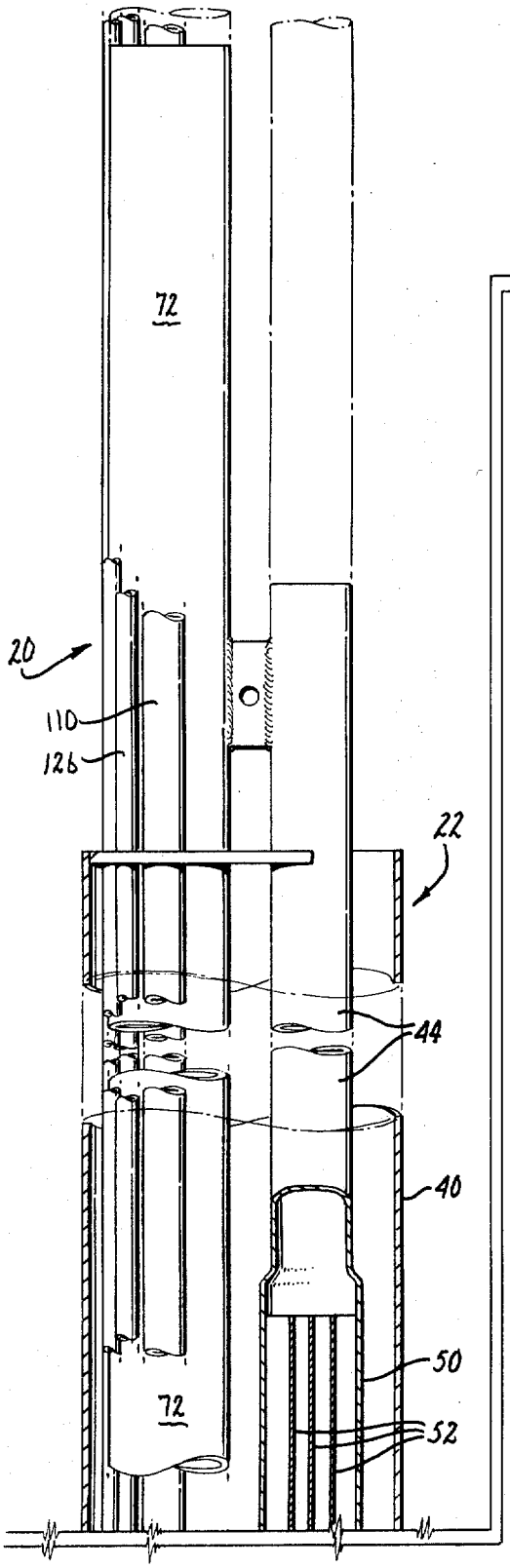
Fig. 3A
Fig. 3B
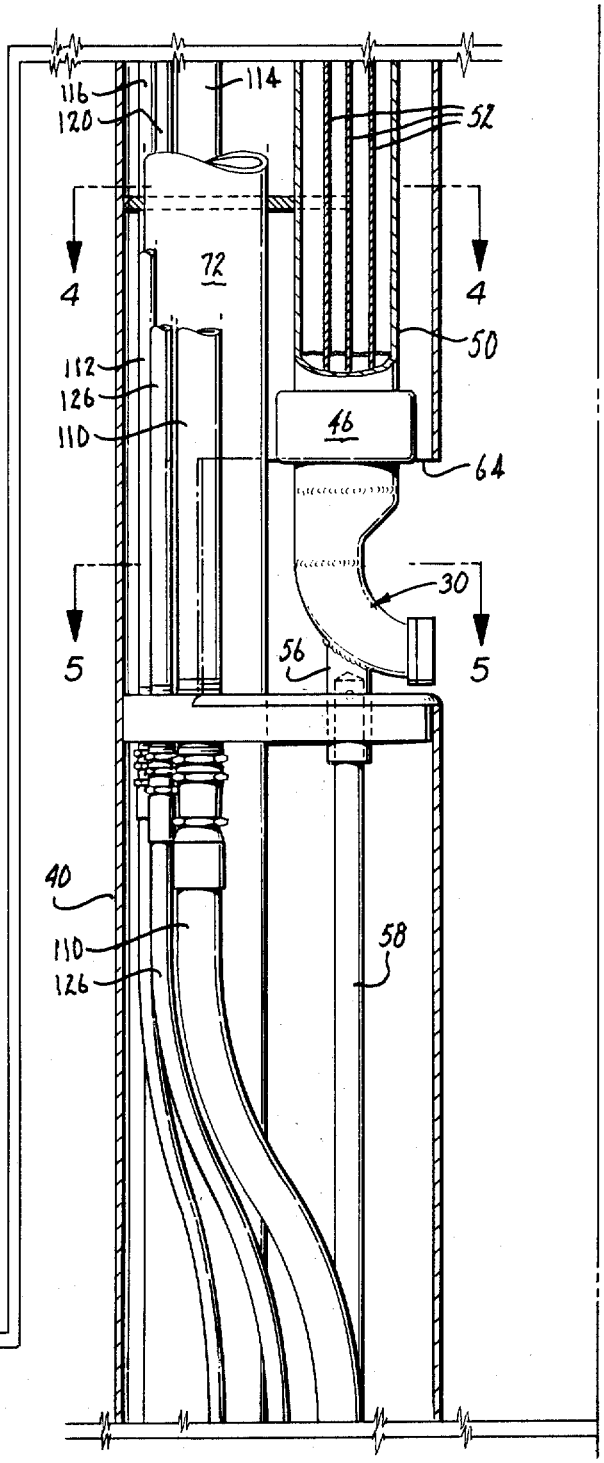

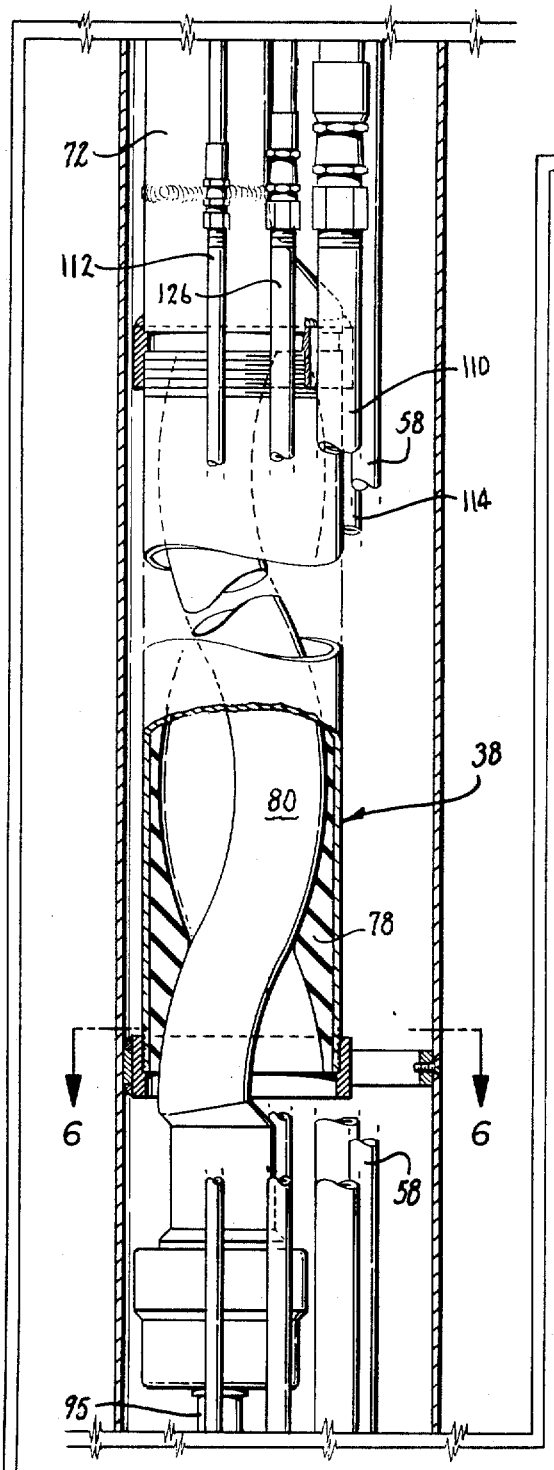
Fig. 3C
Fig. 3D
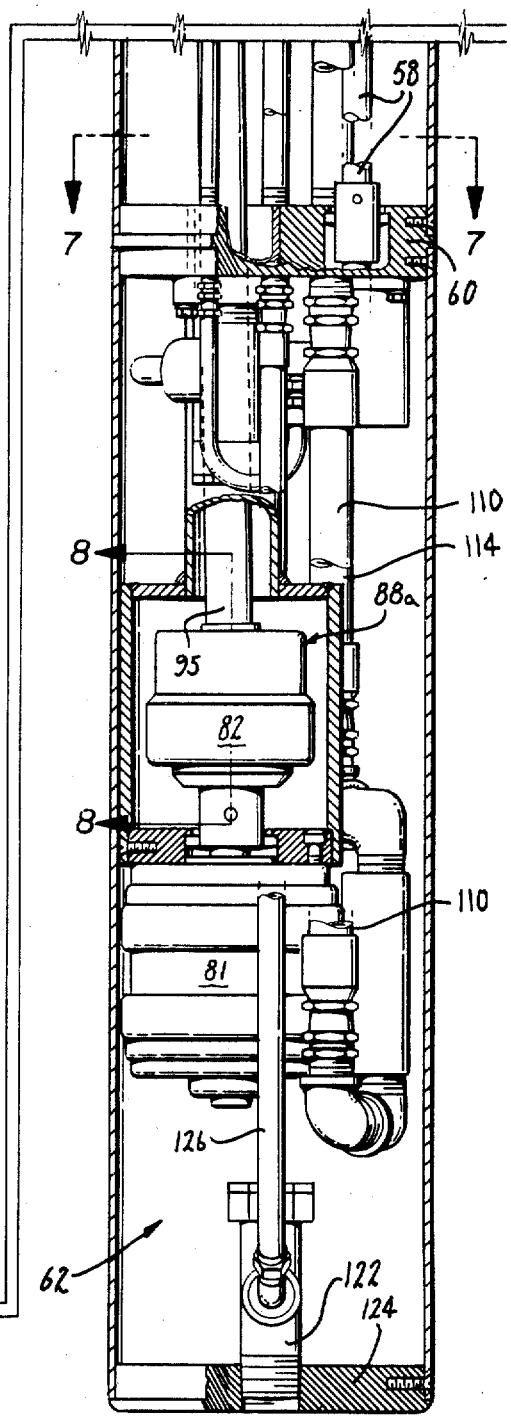

Fig. 4
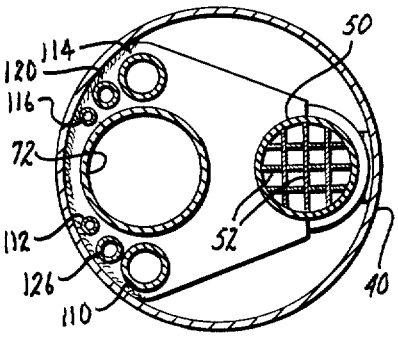
Fig. 5
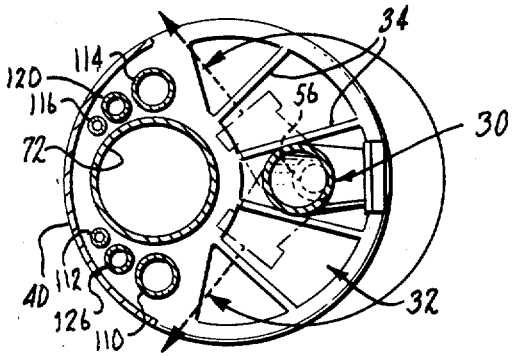
Fig. 6
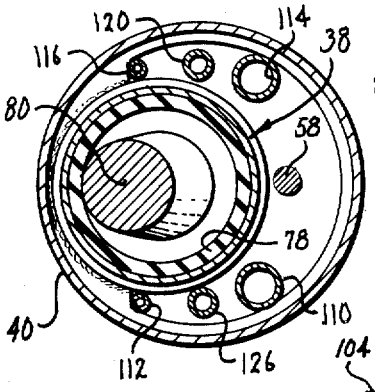
Fig. 7
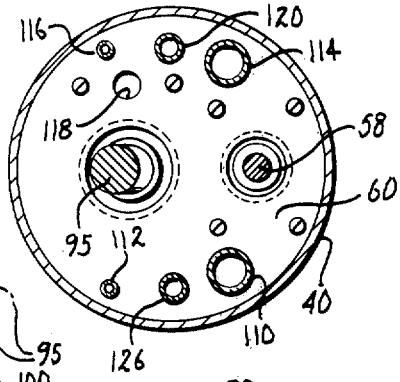
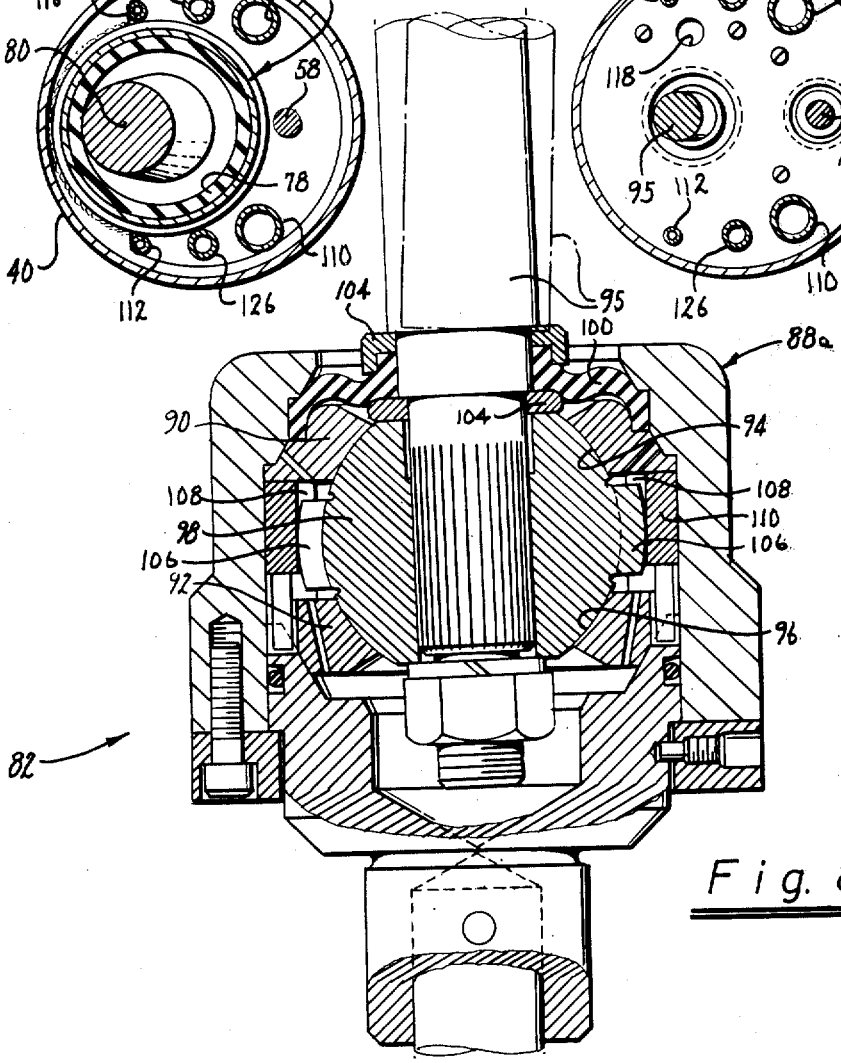
Fig. 8

UNDERGROUND MINING SYSTEM

Matter enclosed in heavy brackets [ ] appears in the original patent but forms no part of this reissue specification; matter printed in italics indicates the additions made by reissue.

BACKGROUND OF THE INVENTION

This invention relates to underground mining. More particularly this invention relates to a hydraulic underground mining system in which mining at significant depths is accomplished by means such that a hydraulic mining fluid is introduced as a jet within a subterranean ore body to form a slurry in which form the ore is removed and brought to the surface.

Subterranean mining of ore bodies by hydraulic mining through well bores has been known, as for example, as set forth in the patent to Aston U.S. Pat. No. 2,518,591. Such mining takes place by slurrification of material in a subterranean mineral deposit and removal of the slurrified material. In the past, jet pumps have been used to lift the slurry out of the mining area. However, the use of jet pumps limits the lift height to [ valves ] *values* which are inadequate for many ore bodies. In addition, jet pumps tend to require large quantities of motive water which results in a very dilute slurry having too low a solids content. This results in consumption of excessive energy and water.

Pressure lift systems have also been proposed, as for example, in the U.S. Pat. No. 3,439,953 to Pfefferle. In such systems, a well bore casing is sealed to the surrounding ground and sufficient pressure is then applied in the subterranean deposit, i.e., internally of the ore body to expel slurrified contents through a conduit to the surface. Such a pressure system is relatively expensive to operate due to weight and power required to make up for seepage loss caused by the porosity of the region surrounding the mined area and also due to the difficulty of maintaining a casing seal under pressures adequate to drive the slurrified material to the surface. Such systems are also subject to casing failure or to failure of the seal. Where the casing or seal has failed, mining through that bore usually becomes impractical and if the overburden subsides upon loss of pressure the entire rig may be unrecoverable. In addition, most prior art systems have required large well bores, often in excess of 2 feet. The cost of drilling large well bores is often too high to permit economic recovery of even shallow ore deposits. There is therefore, a need for a new and improved subterranean mining method and apparatus.

SUMMARY OF THE INVENTION AND OBJECTS

In general, it is an object of the present invention to provide a new and improved hydraulic underground mining system which will overcome the above limitations and disadvantages. It is a further general object of the invention to provide an underground mining system of the above character capable of efficient mining and removal of the mined material as a high solids content slurry in which the water utilized in the mining operation is also used as the suspending liquid for the slurry.

A further object of the invention is to provide an underground mining system of the above character capable of operation through a small diameter well bore at depths significantly greater than one hundred feet.

A further object of the invention is to provide a hydraulic underground mining system of the above character in which there is no requirement for a seal between the well bore casing and the lateral supporting earth.

A further object of the invention is to provide an underground mining system of the above character which eliminates the use of pressure for slurry removal and which has inherently high efficiency and economy of operation.

A further object of the invention is to provide a particularly novel underground mining apparatus.

The foregoing objects are achieved by providing an underground mining system adapted to operate through a well bore drilled into a subterranean body to be mined. The well bore is small in diameter and is drilled completely through the portion of the body to be mined and a further substantial distance below it to provide for insertion of the mining apparatus as will be described. The mining apparatus includes an elongate support structure having a diameter slightly smaller than the well bore and including a mining capsule carried at its lower end. The upper end is suspended in a suitable manner at the ground level as by being carried on a truck mounted drill rig or on a support flange. The mining capsule includes means at its upper end for hydraulically mining into the ore body including jet means for developing a laterally directed liquid jet stream to impact material in the body and pulp the same into a slurry. Below the jet means a discharge sump is formed including a grate for preventing excessively large chunks of material from entering the sump. Means is also provided for moving the jet back and forth through at least a partial arc so that the jet progressively impinges upon material to pulp the same. The material thereafter flows backwardly toward the jet and into the discharge sump. An elongate positive displacement pump is positioned in the sump and has an inlet connected thereto so that pulp slurry flows through the grate and into the pump under gravity. Hydraulic power means drive the pump and suitable piping is provided for supplying hydraulic motive power to a pump motor and to the means for moving the jet nozzle. Additional piping is provided for supplying liquid under high pressure to the jet nozzle and for serving as a slurry discharge line.

These and other objects and features of the invention will become apparent from the following description thereof when taken in conjunction with the accompanying drawings.

BRIEF DESCRIPTION OF FIGURES

FIGS. 3A, 3B, 3C and 3D are enlarged elevational views of the mining capsule of FIGS. 2.

FIG. 4 is a cross-sectional view taken along lines 4—4 of FIG. 3B.

FIG. 5 is a cross-sectional view taken along lines 5—5 of FIG. 3B.

FIG. 6 is a cross-sectional view taken along lines 6—6 of FIG. 3C.

FIG. 7 is a cross-sectional view taken along lines 7—7 of FIG. 3D.

FIG. 8 is a cross-sectional view taken along lines 8—8 of FIG. 3D.

DETAILED DESCRIPTION OF THE PREFERRED EMBODIMENTS

Figure 1:
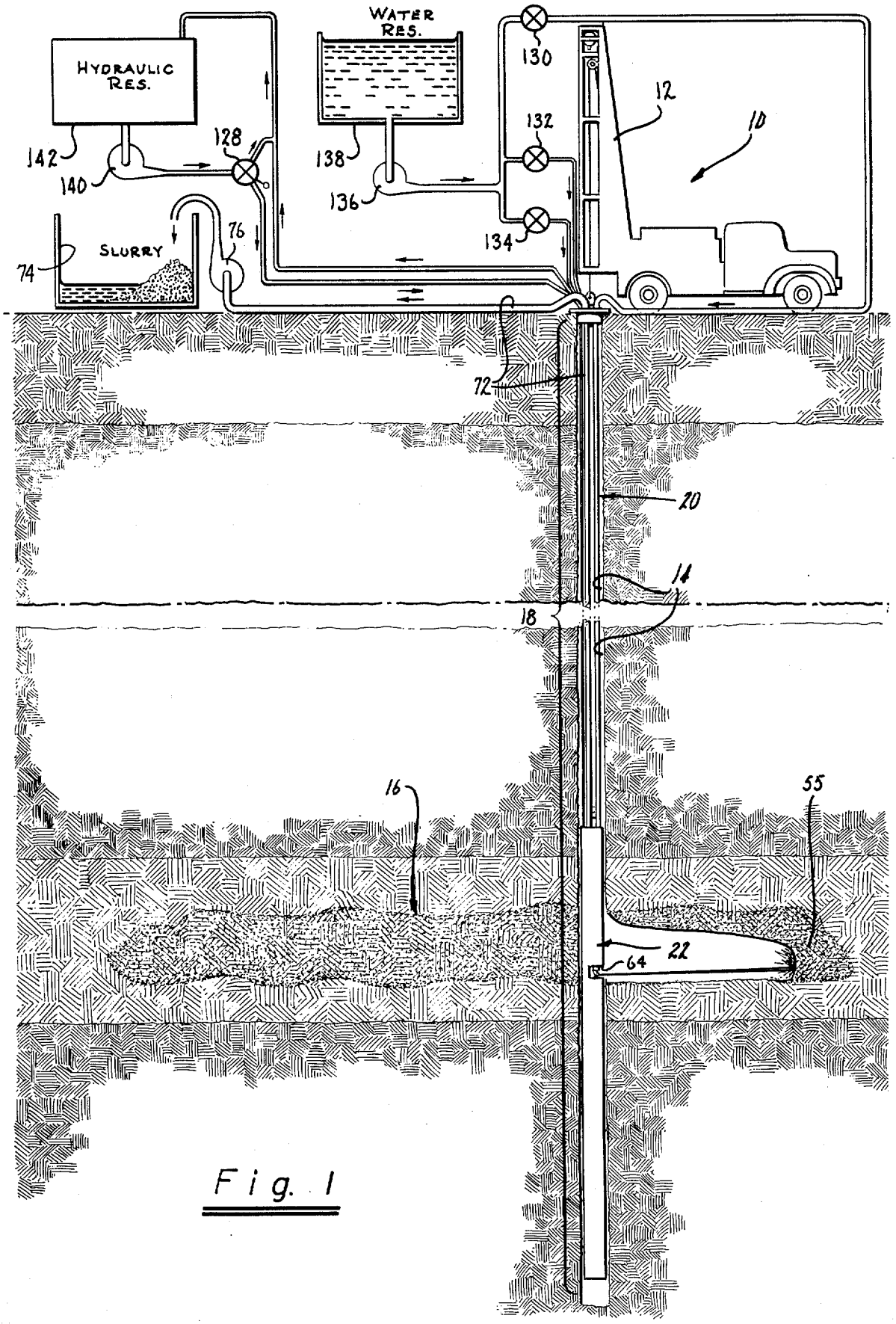
FIG. 1 is a cross-sectional view partly broken away and partly in schematic form of an underground mining system constructed in accordance with the present invention.
Figure 2A:
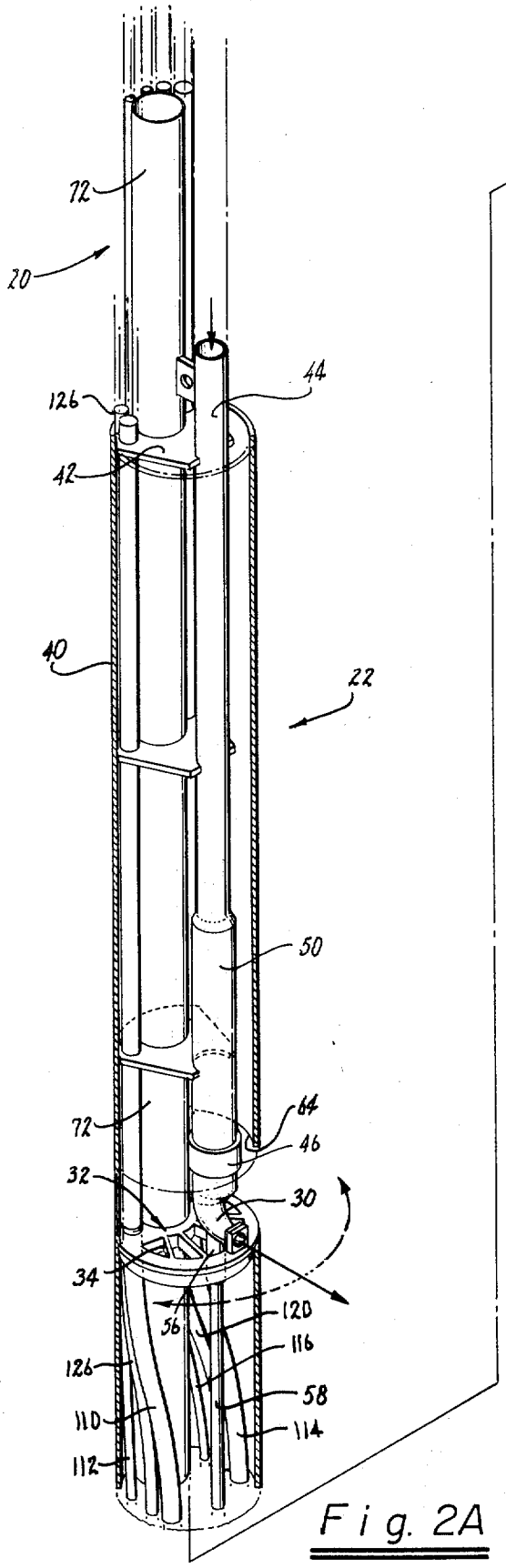
FIGS. 2A and 2B are isometric views of the mining capsule portion of the mining system of FIG. 1.
Figure 2B:
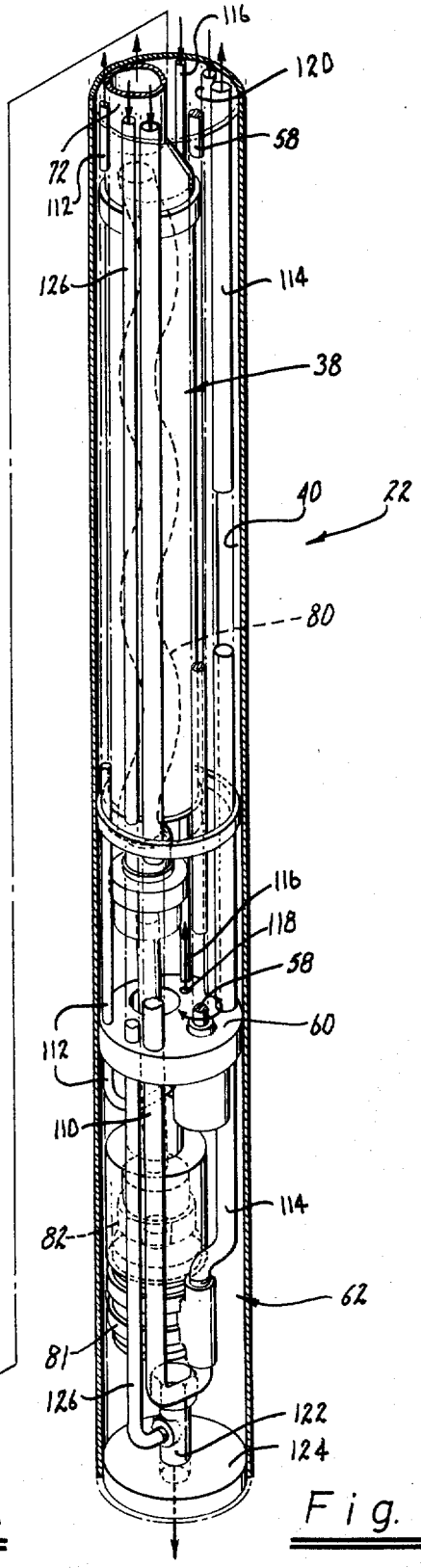

The present invention is adapted to be operated from a relatively conventional drilling rig 10 having a suitable hoist 12. Such a rig is typically truck mounted and is adapted to move from place to place over a subterranean ore body. As shown, a well bore 14 is drilled through the ore body 16 and down into the formations beneath the same to provide space for the mining apparatus 18 of the present invention. After drilling, the well bore may be lined if desired down to the depth of the upper portion ore body. In many situations the sufficient lateral stability exists after drilling that lining of the hole will not be necessary, suitable capping being sufficient.

As shown in FIG. 1, the mining apparatus includes an upper portion 20 serving as an elongate support structure which is made up of several sections sufficient to obtain the desired depth so that the mining capsule 22 carried on the lower end is positioned for operation into the ore body.

Referring now particularly to FIGS. 2 through 8, the mining capsule portion of the apparatus of the present invention will now be described in detail after which the supporting connections of the upper portion of the structure together with the ground level associated facilities will be described.

In general the mining capsule includes in its upper section a means forming a liquid jet nozzle 30 immediately below which is mounted a slurry discharge opening 32 having a grate 34 thereover preventing the entry of excessively large particles. The opening communicates interiorly of the capsule with the inlet 36 of a slurry discharge pump 38 constructed in elongate form and positioned below the jet and grate so that entering slurry flows into the pump under gravity.

The entire capsule is suitably supported in an elongate cylindrical sleeve 40 terminating in its upper end in a transverse flange 42. This flange positions several piping elements of the structure and is one of several located throughout the length thereof for vertical support and positioning purposes. A high pressure water or hydraulic inlet pipe 44 is connected through a rotatable bearing assembly 46 to the input of a liquid jet nozzle 30. Immediately preceding the nozzle is a section 50 of expanded pipe diameter containing a plurality of straightening vanes 52 to assist in maintaining laminar flow of liquid or water through the pipe to the nozzle. The structure of the straightening vanes and nozzle as such are disclosed in co-pending application entitled Liquid Jet Nozzle, Ser. No. 213,363 filed Dec. 29, 1971, and assigned to the same assignee as the present application. The bearing 46 may be of any suitable type provided it is capable of withstanding internal liquid pressure. The rotatable portion of the bearing is integrally attached to the upper or inlet end of the nozzle. The nozzle makes a turn through 90° and terminates in a discharge orifice 54 which opens laterally to thereby direct a high velocity liquid jet stream into impact contact against the material in a portion 55 of the adjacent body to be mined. The lower end of the nozzle is provided with a turning lug 56 which is connected through a drive shaft 58 to an oscillating motor located beneath a seal flange 60 defining the upper end of a motor well 62 at the lowermost end of the mining capsule. (See particularly FIG. 2B) The shroud or casing is provided with an opening 64 therein (see particularly FIGS. 2A and 3B). The opening extending about an arc of about 270° to 320° in front of the nozzle orifice in this way, the liquid jet nozzle is rotated through a substantial arc from one side to another in an oscillating pattern, thereby progressively moving the region of impact of the liquid jet stream within the body from one location to another. As the material is pulped into slurry form, it flows backward toward the capsule where it is removed through opening 32.

Means is provided for forming opening 30 immediately below the liquid jet nozzle. The opening is covered with grating 34 which prevents excessively large chunks of material from entering, such chunks being held out and eventually reimpacted by the liquid jet stream and broken up. The opening serves as the inlet to an elongate positive displacement pump 38, positioned below the orifice and connected thereto. The upper end of the pump terminates in a relatively large diameter slurry discharge line 72 which extends upwardly to ground level and terminates in an outlet over a discharge pond or vessel 74. Additional pumping facilities 76 may be incorporated in the line to provide booster service.

The pump is preferably of the elongate progressive cavity type commonly known as a Moyno (registered trademark) type, having a outer resilient shell or stator 78 with an inwardly facing helically formed surface. Within the outer shell is positioned a rotor member 80 having an outwardly facing helically formed surface with one fewer turns than the stator 78. Such structures are known to be useful as pumps and are disclosed by way of example in U.S. Pat. Nos. Re. 21,374 dated Feb. 27, 1940 to R. Moineau and 2,505,136 dated Apr. 25, 1950 also to R. Moineau, and many others. The outer member is typically constructed of resilient material which facilitates its use for handling any slurriable material that can be pushed through a pipe. Such pumps are of a positive displacement type because the rotor and the stator difference in turns defines a cavity which is progressively moved in one direction or another as the rotor is rotated. Such pumps are commercially available from the Moyno Pump Division of Robbins & Meyers, Inc., Springfield, Ohio. The pump is driven by hydraulic motor 81 mounted in the lowermost section of the capsule in motor compartment 62.

The motor is connected through a universal drive coupling 82 to the rotor 80 of the pump, the drive coupling arrangement being shown particularly in FIGS. 3D and 6 through 8. As particularly indicated in FIG. 3C, the lower end of the rotor terminates in offset relationship to the axis of the pump so that as the same is rotated the lower end is caused to precess or wobble about the axis. The universal drive now to be described accommodates the axial rotation of the drive motor to the precessive movement of the pump rotor. The drive shaft terminates at each end in a spherical, dental element drive, the detailed construction of each of which is the same and is shown in FIG. 8. Thus, the driving or driven shaft terminates in a two part housing bolted together and containing therein upper and lower thrust bearings 90, 92 having radially facing inward thrust bearing surfaces 94, 96 lying in contact with a ball 98 splined to the drive shaft 95. The upper and lower bearings are disposed to bear above and below the ball surface so that axial thrust load can be taken in either direction through the coupling. A suitable flexible seal 100 is retained in position between a retaining ring 102 and lock collar 104 at the shaft end of the coupling device and terminates in a radially spaced position between the inner thrust bearing 90 and the cap 88a of the housing. Rotary motion is carried through the coupling by means of a plurality of teeth 106 carried on the outer circumference of the ball, the teeth engaging between the teeth 108 of a ring 110 carried in fixed position in the housing and surrounding the ball.

FIGS. 6 and 7 show sectional views which locate the various components intermediate the motor well and the pump.

Suitable hydraulic piping and connections are provided and consist of a pair of input lines 110, 112 and output lines 114, 116 to each of the motors.

In addition to the foregoing, a flushing nozzle jet 118 is connected to the high pressure water source through suitable piping 120. This jet is clearly seen in FIG. 2B and is used to control the liquid content of the slurry pumped through the pump during operation so as to assure that it does not become an undue load on the pump. The jet is also useful for flooding the pump during start-up.

Preferably an additional high pressure water jet nozzle 122 is positioned through the bottom flange 124 of the mining capsule housing and is directed downwardly to facilitate raising and lowering the assembly through the well bore. Suitable piping 126 connects nozzle 122 to the high pressure water supply.

For the purpose of operating the several functions of the nozzles and motors suitable valves 128 through 134 are incorporated in the various lines. A pump 136 connecting the high pressure water lines to a water reservoir 138. A separate pump 140 connects the hydraulic line to hydraulic reservoir 142. Valve 128 is arranged for reversible operation to provide for reverse the pump.

In operation, the apparatus of the present invention is lowered into the predrilled well bore in stages a convenient length being about twenty feet per stage. As each stage is lowered, it is held on to by suitable gripping means while the next stage is connected. Upon reaching the predetermined depth for operation the entire unit is supported in position by the drilling rig. If necessary, valve 134 and nozzle 122 may be operated to flush material upwardly from the lower end of the well bore and thereby facilitate movement of the assemblage downwardly. After proper positioning the valves 128 are open and hydraulic mining is commenced. As the jet nozzle is oscillated, the jet stream cuts the material within the ore body and causes it to be pulped into a slurry and flow backward to the capsule where it drains into the opening 30 and delivered through the elongate slurry pump and pumped to the surface. By operating through a limited arc less than a full circle sufficient material remains in the vicinity of the well bore to prevent gross subsidence at the surface. As the material is removed, the overburden from within the cavity formed in the region of the removed material usually collapses once the mining radius reaches a significant distance. As a practical matter, distances of up to seventy-five feet can be mined from a single well bore utilizing the apparatus of the present invention.

Using the present invention, many underground ore bodies can be mined even though they exist at significant depths. The only requirements are that the material to be mined be reasonably friable, unconstituted, and unconglomerated. Sands, gravel, phosphate ores, friable coals, and uranium ore are examples of materials which can be mined using the present invention.

To those skilled in the art to which this invention pertains, many modifications and adaptations thereof will suggest themselves. Accordingly, it should be understood that the specific disclosures and descriptions contained herein are to be taken in an illustrative sense and that the scope of the invention is not to be limited thereby except in accordance with the accompanying claims.

We claim:

1. Hydraulic mining apparatus for operating through a well bore drilled into a subterranean body to be mined, comprising an elongate support structure, means for suspending said support structure in said well bore, a mining capsule carried on the lower end of said support structure, said mining capsule comprising means at its upper end for hydraulically mining said ore body including jet means for developing a laterally directed liquid jet stream to impact material in said body and pulp the same into a slurry, means for moving said jet means back and forth through at least a partial arc, means forming a discharge orifice positioned below said jet and including grate means for preventing excessively large chunks of material from entering said orifice, means forming an elongate positive displacement pump positioned below said orifice and connected thereto so that pulped slurry flows through said grate and orifice and into pump under gravity, hydraulic power means for driving said pump, piping means for connecting said hydraulic power means to the ground level end of said apparatus, and a slurry discharge line connected to the outlet end of said pump, said discharge piping extending upwardly to the ground level end of said apparatus and through said support structure.

2. Hydraulic mining apparatus as in claim 1 in which said positive displacement pump is of a linear type including means for forming a succession of cavities linearly arranged and progressively moveable in either direction of said pump whereby said pump may be reversed or operated in a positive sense to provide for flushing and start-up pumping.

3. Apparatus as in claim 2 further including a flushing jet connected to the inlet end of said pump for flooding the same during start-up and for controlling the liquid content of slurry during operation.

4. Hydraulic mining apparatus as in claim 1 further including a cylindrical shroud extending the length of said apparatus and serving to stabilize the well bore in which said apparatus is positioned.

5. Hydraulic mining apparatus as in claim 1 in which said pump and the [ motor ] *power* means for operating said pump and for moving said jet means are located in the lowermost portion of said capsule and beneath said orifice.

6. Hydraulic mining apparatus as in claim 1 including a flushing jet positioned at the lowermost end of said apparatus and directed downwardly therefrom for facilitating movement of said apparatus in said well bore.

*7. Mining apparatus for operating through a subterranean bore extending from the exterior surface of the ground and into a subterranean body of friable material to be mined, comprising support means, a mining assembly carried by the support means within the bore and in the region of the body, the mining assembly being a*

*compact structural unit dimensioned with respect to the dimensions of the bore to enable the same to be transported into the bore to a desired position within the body, the assembly unit including jet means for discharging a liquid jet stream into the body to impact the material in the body and pulp the same into a slurry, means for moving the jet means through at least a partial arc whereby a cavity is progressively formed in the body from which the slurry flows toward the assembly unit, the assembly unit having an opening located below the zone of operation of the jet means and disposed to receive the slurry flow, a grate disposed in the opening for preventing excessively large chunks of material from entering said opening, an elongated mechanical pump forming a part of the assembly unit and having an inlet at one end of the same and a discharge outlet at the other end, the inlet being connected to receive slurry flowing through the opening and the grate, the pump being in general alignment with the bore, means for driving the pump, means including piping connected to the outlet of the pump and extending through the bore from one end of the unit to the ground surface for the discharge of slurry, and means including piping extending through the bore from the ground surface for delivering liquid under pressure to the jet means.*

*8. Mining apparatus as in claim 7 in which the bore extends downwardly and the assembly is an elongated unit that includes the jet means, the grate, and the pump, and means for supplying driving power to the pump from the surface of the well.*

*9. Mining apparatus for operating through a well bore extending down into a subterranean body of friable material to be mined, comprising a support means, a mining assembly carried by said support means within the well*

*bore, the mining assembly being a compact structural unit dimensioned with respect to the dimensions of the bore to enable the same to be transposed into the bore to a desired position within the body, said mining assembly unit comprising means for hydraulically mining said ore body including jet means for developing a laterally directed liquid jet stream to impact material in said body and pulp the same into a slurry, means for moving said jet means through at least a partial arc whereby a cavity is progressively formed in the body from which the slurry flows toward the assembly unit, means forming a slurry receiving opening positioned below the zone of operation of the jet means and including grate means for preventing excessivley large chunks of material from entering said opening, an elongated mechanically driven pump forming a part of the assembly unit and having an inlet at one end of the same and a discharge outlet at the other end, the inlet being connected to the opening so that pumped slurry flows through said grate and opening and into the intake at the lower end of said pump, the pump being in general alignment with the bore, means for supplying driving power to the pump from the upper ground surface, a slurry discharge line connected to the outlet of the pump, said discharge line extending upwardly through the bore to the ground level, and means including piping extending through the bore from the ground surface for deliverying liquid under pressure to the jet means.*

*10. Mining apparatus as in claim 9 in which the assembly is in the form of an elongated unit which includes the jet means, the slurry receiving opening and grate means, and the pump, all disposed along the length of the unit.*

* * * * *